United States Patent [19]

Sakata et al.

[11] Patent Number: 5,083,065
[45] Date of Patent: Jan. 21, 1992

[54] LIGHTING DEVICE FOR ELECTRIC DISCHARGE LAMP

[75] Inventors: Masao Sakata; Toru Segoshi, both of Yokohama; Tohru Futami, Fujisawa; Yoichi Iijima, Sagamihara, all of Japan

[73] Assignee: Nissan Motor Co., Ltd., Yokohama, Japan

[21] Appl. No.: 599,929

[22] Filed: Oct. 19, 1990

[30] Foreign Application Priority Data

Oct. 23, 1989 [JP] Japan ................................ 1-273705

[51] Int. Cl.⁵ .......................................... H05B 41/36
[52] U.S. Cl. ...................................... 315/307; 315/82; 315/209 R; 315/DIG. 7
[58] Field of Search ................. 315/82, 224, 307, 308, 315/DIG. 2, DIG. 5, DIG. 7, 209

[56] References Cited

U.S. PATENT DOCUMENTS

| | | | |
|---|---|---|---|
| 4,412,154 | 10/1983 | Klein | 315/307 X |
| 4,611,150 | 9/1986 | Ball et al. | 315/307 |
| 4,698,554 | 10/1987 | Stupp et al. | 315/205 X |
| 4,904,905 | 2/1990 | Olon | 315/307 X |
| 4,928,038 | 5/1990 | Nerone | 315/307 X |

Primary Examiner—David Mis
Attorney, Agent, or Firm—Foley & Lardner

[57] ABSTRACT

A lighting device for an electric discharge lamp comprises an LC series resonant circuit, and control means for controlling an inverter circuit. Immediately after the occurrence of a dielectric breakdown in the electric discharge lamp. AC voltage with a relatively low frequency is applied to the lamp so as to pass a heavy current therethrough. Subsequently, the frequency is increased stepwise by a relatively small variation until a terminal voltage of the electric discharge lamp reaches a predetermined value. Thereafter, the frequency is increased stepwise by a relatiely large variation until the electric discharge lamp assumes a discharge stable state.

4 Claims, 7 Drawing Sheets

LIGHTING DEVICE FOR ELECTRIC DISCHARGE LAMP

BACKGROUND OF THE INVENTION

The present invention relates generally to a lighting device for an electric discharge lamp such as a mercury-vapor lamp, a sodium-vapor lamp or a metal halide lamp and, more particularly, to a current control technique during a period ranging from a starting of the electric discharge lamp to a discharge stable state thereof.

Various kinds of lighting devices for an electric discharge lamps have previously been proposed. One of these lighting devices is described in, for example, HANDBOOK OF LIGHTING, pp. 198-201, 1st edition, published on May 20, 1983, by OMU-SHA Co., Ltd., in HANDBOOK OF ·ELECTROTECHNOLOGY, pp. 1539-1541, 1st edition, published on Apr. 10, 1978, by DENKI-GAKKAI Corp.

Figure 5:
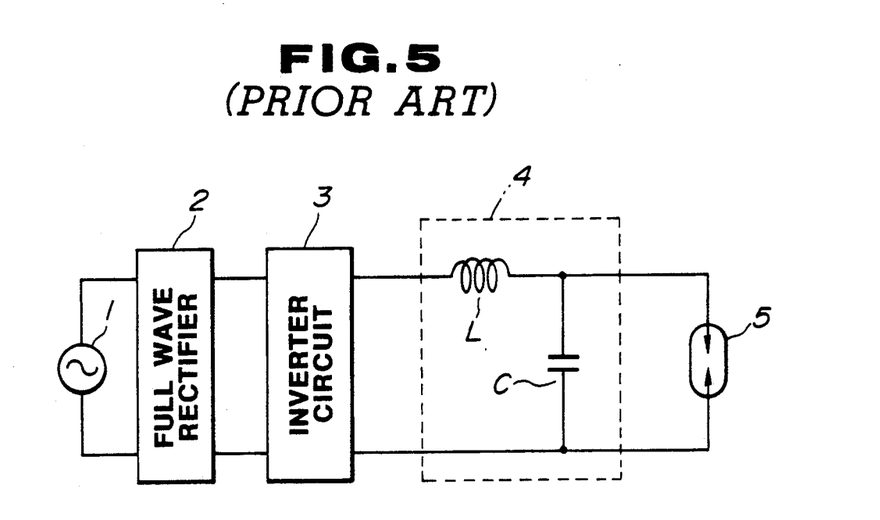
FIG. 5 is a view similar to FIG. 1, illustrating a known lighting device for an electric discharge lamp.

Referring to FIG. 5, there is shown such known lighting device for an electric discharge lamp.

Before describing the known lighting device for an electric discharge lamp, a characteristic of change in luminous energy of the electric discharge lamp will be described. It is to be noted that the description will be made in connection with the metal halide lamp.

The metal halide lamp includes a bulb filled with a mixed gas, and a pair of electrodes which are opposite to each other across a gap.

If a high voltage is applied between the electrodes so as to induce a dielectric breakdown of the mixed gas in the bulb, an impedance of the bulb decreases from $\infty$ (= value when the bulb is in insulated state) to tens $\Omega$, causing a current flow between the electrodes. This current is called "discharge current".

Due to this discharge current, the temperature in the vicinity of the gap increases, and, finally, the mixed gas begins to emit a light. In response to increase in temperature in the bulb, the impedance thereof becomes higher, and the lamp assumes a negative characteristic that a terminal voltage of the bulb increases as the discharge current decreases.

Figure 4:
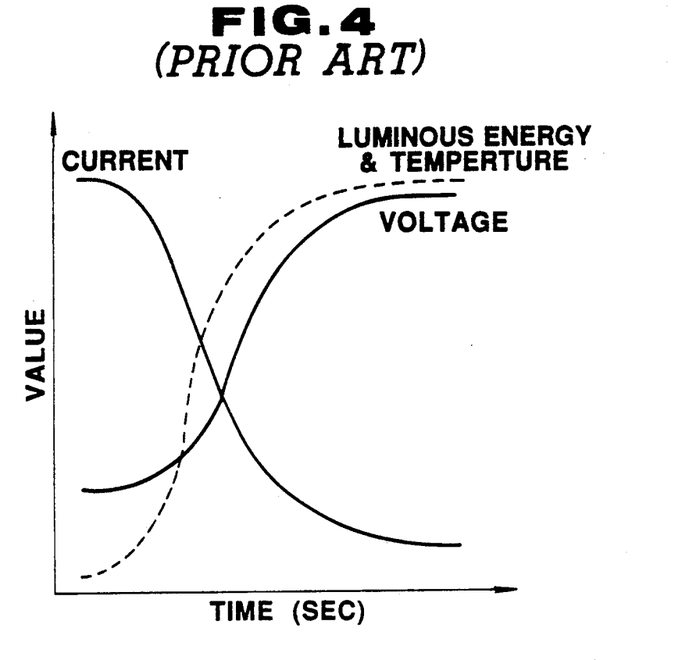
FIG. 4 is a view similar to FIG. 3b, showing changes in a discharge current, a terminal voltage, a gas temperature, and the luminous energy for the electric discharge lamp, respectively.

Referring to FIG. 4, the luminous energy and the gas temperature are changed in a similar manner, whereas the luminous energy and the discharge current are in inverse proportion to each other, and the luminous energy and the terminal voltage are in proportion to each other. Each of the luminous energy, the gas temperature, the discharge current, and the terminal voltage undergoes a sudden change during a few seconds after starting of the lamp, and falls into a saturated state, i.e., a discharge stable state after a few subsequent seconds.

If the discharge current is so controlled as to assume a larger value (2 A, for example), a predetermined value of luminous energy is obtained quickly, however, the luminous energy of the lamp exceeds the predetermined value in the discharge stable state, resulting in decreased longevity thereof. On the other hand, if the discharge current is so controlled as to assume a smaller value (0.5 A, for example), from starting of the lamp, in response to the discharge stable state, a relatively long time is needed until the predetermined value of luminous energy is obtained.

Referring again to FIG. 5, the lighting device for an electric discharge lamp includes an AC power supply 1, a full wave rectifier 2, an inverter circuit 3, a series resonance circuit 4 having a coil L and a condenser C connected in series, and an electric discharge lamp 5.

Upon starting of the electric discharge lamp 5, if a voltage having a frequency of the order of 100 kHz, for example, is applied to the LC series resonance circuit 4 via the circuit 3, a high voltage of the order of 10 kV appears between both ends of the electric discharge lamp 5, resulting in occurrence of dielectric breakdown of a filler gas in the electric discharge lamp 5. Simultaneously with the occurrence of dielectric breakdown, if the frequency is decreased to about 10 kHz, a current of the order of 1 A passes through the electric discharge lamp 5 due to low gas temperature, i.e., low resistance value of the lamp 5. Thereafter, the resistance value of the electric discharge lamp 5 increases with a rise in gas temperature, so that the current decreases gradually. When the gas temperature becomes stable, the current comes to 0.4–0.5 A, and falls into a saturated state, thus obtaining a predetermined value of luminous energy of the electric discharge lamp 5.

When serving as a headlamp for a motor vehicle, the electric discharge lamp 5 is more advantageous than a filament lamp in view of a size, a weight, and/or an efficiency.

With the electric discharge lamp 5 as described above, however, if the voltage and frequency to be applied is so established as to obtain the predetermined value of luminous energy when the lamp 5 falls into a discharge stable state, a relatively long time is needed before the electric discharge lamp 5 comes to the predetermined value of luminous energy. On the other hand, in order to shorten the aforementioned time, if the voltage and frequency to be applied are so established as to obtain the predetermined value of luminous energy before the electric discharge lamp 5 falls in the discharge stable state, i.e., while it is in a transient state of lighting, the luminous energy of the lamp 5 exceeds the aforementioned predetermined value in the discharge stable state, resulting in decreased longevity thereof. Thus, the prior art electric discharge lamp 5 cannot satisfactorily serve as the headlamp for a motor vehicle which has to achieve the predetermined value of luminous energy immediately after starting, and must be durable in construction.

SUMMARY OF THE INVENTION

It is, therefore, an object of the present invention to provide a lighting device for an electric discharge lamp which is quick to generate luminous energy after starting, and assures a desired luminous energy in the discharge stable state.

According to one aspect of the present invention, there is provided a method of starting an electric discharge lamp bulb until the electric discharge lamp bulb assumes a predetermined discharge stable state, comprising the steps of:

monitoring the electric discharge lamp bulb; and controlling an electric power supplied to the electric discharge lamp bulb in response to a result of said monitoring step.

According to another aspect of the present invention, there is provided a method of starting an electric discharge lamp bulb until the electric discharge lamp bulb assumes a predetermined discharge stable state, comprising the steps of:

monitoring the electric discharge lamp bulb;

comparing a result of said monitoring step with a predetermined value; and controlling an electric power supplied to the electric discharge lamp bulb in response to a result of said comparing step.

According to still another aspect of the present invention, there is provided a method of starting an electric discharge lamp bulb while the electric discharge lamp bulb assumes a predetermined discharge stable state, the electric discharge lamp bulb being connected with a power unit, the method comprising the steps of:

monitoring the electric discharge lamp bulb;

comparing a result of said monitoring step with a predetermined value; and controlling the power unit in response to a result of said comparing step.

According to further object of the present invention, there is provided a system for starting an electric discharge lamp bulb until the electric discharge lamp bulb assumes a predetermined discharge stable state, comprising:

means for monitoring the electric discharge lamp bulb; and means for controlling an electric power supplied to the electric discharge lamp bulb in response to a result of said monitoring step.

According to a still further object of the present invention, there is provided a system for starting an electric discharge lamp bulb until the electric discharge lamp bulb assumes a predetermined discharge stable state, comprising:

means for monitoring the electric discharge lamp bulb;

means for comparing a result of said monitoring step with a predetermined value; and means for controlling an electric power supplied to the electric discharge lamp bulb in response to a result of said comparing step.

According to another object of the present invention, there is provided a system for starting an electric discharge lamp bulb until the electric discharge lamp bulb assumes a predetermined discharge stable state, the electric discharge lamp bulb being connected with a power unit, the system comprising:

means for monitoring the electric discharge lamp bulb;

means for comparing a result of said monitoring step with a predetermined value; and means for controlling the power unit in response to a result of said comparing step.

According to still another aspect of the present invention, there is provided a method of starting an electric discharge lamp bulb until the electric discharge lamp bulb assumes a predetermined discharge stable state, comprising the steps of:

supplying an electric power to the electric discharge lamp bulb;

detecting a terminal voltage across the electric discharge lamp bulb;

determining whether said terminal voltage is greater than a predetermined value; and increasing a frequency of the electric power in a first frequency value when it is determined that said terminal voltage is greater than said predetermined value.

According to further aspect of the present invention, there is provided a system for starting an electric discharge lamp bulb until the electric discharge lamp bulb assumes a predetermined discharge stable state, comprising:

a source of an electric power, said electric power being supplied to the electric discharge lamp bulb;

means for detecting a terminal voltage across the electric discharge lamp bulb;

a control unit including:

means for determining whether said terminal voltage is greater than a predetermined value; and means for increasing a frequency of the electric power in a first frequency value when it is determined that said terminal voltage is greater than said predetermined value.

According to still further object of the present invention, there is provided method of starting an electric discharge lamp bulb until the electric discharge lamp bulb assumes a predetermined discharge stable state, comprising the steps of:

supplying an electric power to the electric discharge lamp bulb;

detecting a terminal voltage across the electric discharge lamp bulb;

determining whether said terminal voltage is greater than a predetermined value;

setting a frequency of the electric power to a first frequency value when it is determined that said terminal voltage is greater than said predetermined value; and setting a frequency of said electric power to a second frequency value when it is determined that said terminal voltage is not greater than said predetermined value.

According to even further object of the present invention, there is provided a system for starting an electric discharge lamp bulb until the electric discharge lamp bulb assumes a predetermined discharge stable state, comprising:

a source of an electric power, said electric power being supplied to the electric discharge lamp bulb;

means for detecting a terminal voltage across the electric discharge lamp bulb;

a control unit including:

means for determining whether said terminal voltage is greater than a predetermined value;

means for setting a frequency of the electric power to a first frequency value when it is determined that said terminal voltage is greater than said predetermined value; and means for setting a frequency of said electric power to a second frequency value when it is determined that said terminal voltage is not greater than said predetermined value.

DETAILED DESCRIPTION OF THE INVENTION

Referring to the accompanying drawings, preferred embodiments of a lighting device for an electric discharge lamp according to the present invention will be described. It is to be noted that the same reference numerals are given to the same elements in the drawings.

Figure 1:
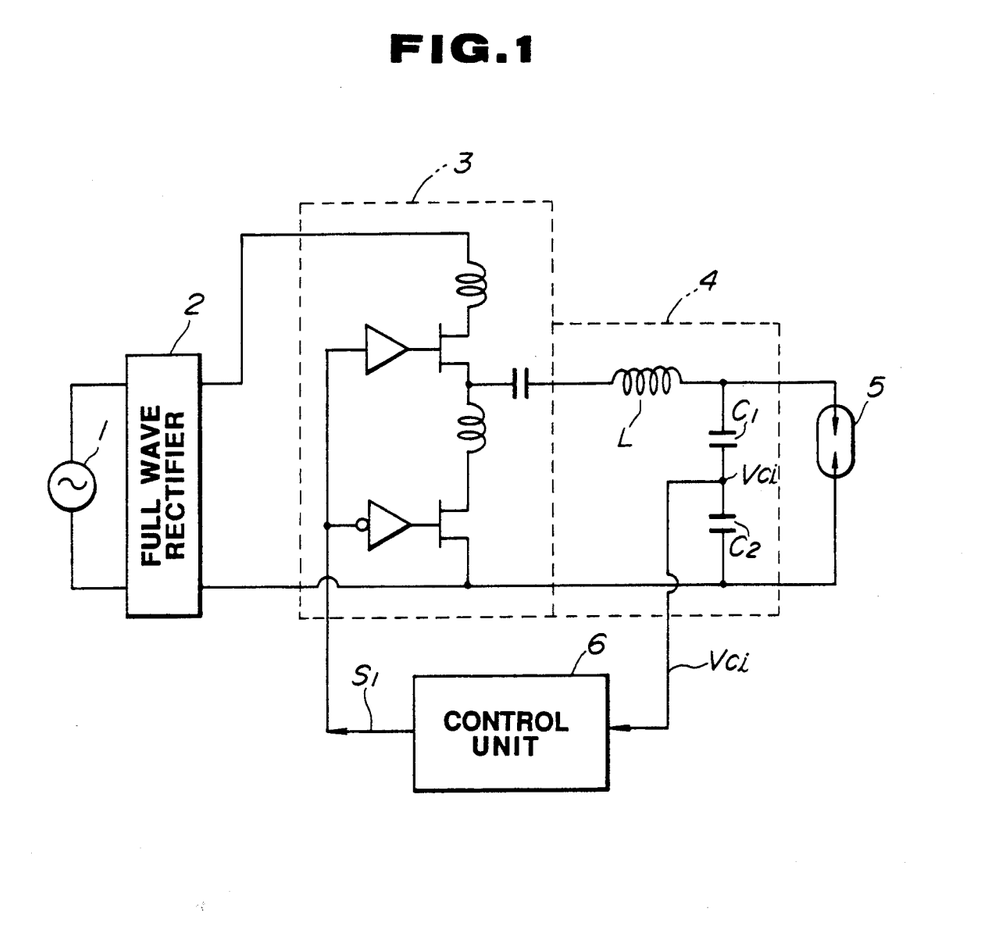
FIG. 1 is a circuit diagram illustrating a first preferred embodiment of a lighting device for an electric discharge lamp according to the present invention.

Referring to FIG. 1, there is shown a first preferred embodiment of the present invention. A lighting device for an electric discharge lamp includes an AC power supply 1, and a full wave rectifier 2. It is to be noted that, when a battery serves as a power supply on a motor vehicle, for example, a DC-DC converter increasing a battery voltage of 12 V to a predetermined voltage (of the order of 300 V, for example) can be used instead of the AC power supply 1, and the full wave rectifier 2. The lighting device further includes an inverter circuit 3 which changes DC power to AC power having a predetermined frequency, a series resonance circuit 4 having a choke coil L and condensers $C_1$ and $C_2$ connected in series, an electric discharge lamp 5, and a control unit 6. The control unit 6, which provide a signal $S_1$ for controlling the inverter circuit 3, include an analogue or digital circuit for the special purpose, or a microcomputer. It is to be noted that a series circuit having the condensers $C_1$ and $C_2$ connected in series is arranged to detect a terminal voltage of the electric discharge lamp 5.

Figure 2:
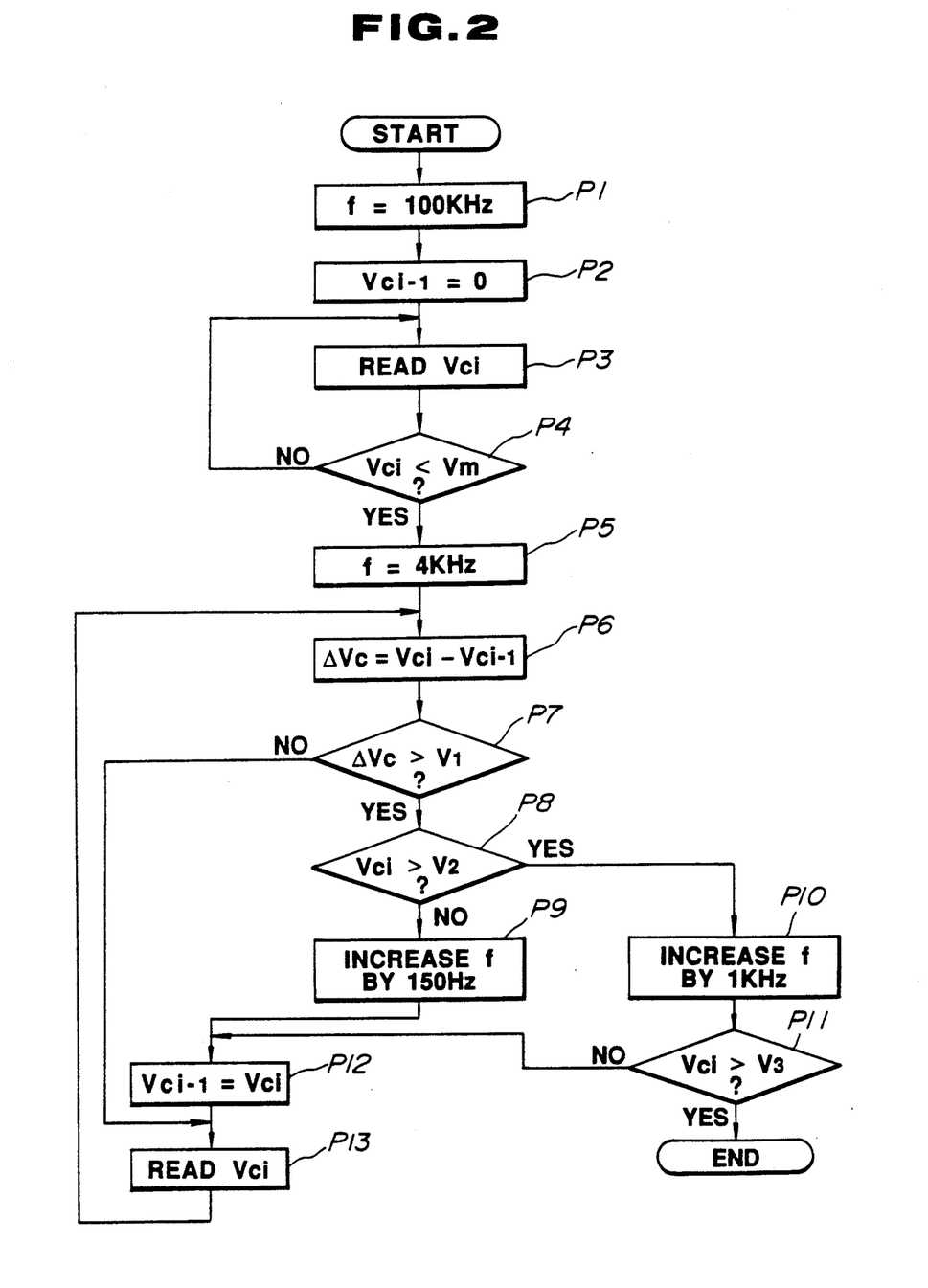
FIG. 2 is a flowchart of a control executed by a control unit shown in FIG. 1.

Referring to FIG. 2, the operation of this embodiment will be described. The control flow executed by the control unit 6 is repeated every predetermined time.

At a step P1, a frequency of the signal $S_1$ is established to 100 kHz subsequently to a turning-on of a light switch (not shown) for ON/OFF operation of the electric discharge lamp 5. As a result, the inverter circuit 3 produces AC voltage with 100 kHz which is applied to the LC series resonance circuit 4, resulting in appearance of the high voltage of the order of 10 kV between both ends of the electric discharge lamp 5.

At a step P2, a voltage value $V_{ci-1}$ is cleared to zero. This voltage value $V_{ci-1}$ is a value for use in a previous control, and indicates a voltage $V_{ci}$ at a junction of the condensers $C_1$ and $C_2$.

At a step P3, a voltage value $V_{ci}$ for use in an actual control is read. This voltage value $V_{ci}$ is obtained by dividing between the two condensers $C_1$ and $C_2$ a voltage which is applied between both ends of the electric discharge lamp 5, and it is proportional to the voltage between both ends thereof.

At a step P4, it is determined based on a comparison between the value $V_{ci}$ and a predetermined value $V_m$ whether a dielectric breakdown occurs in the electric discharge lamp 5 or not. Specifically, since the voltage value $V_{ci}$ is higher when a filler gas in the electric discharge lamp 5 is in insulated state, and it is lower when the filler gas is broken down, it can be determined based on the comparison between the value $V_{ci}$ and the predetermined value $V_m$ whether the dielectric breakdown occurs in the electric discharge lamp 5 or not.

If the answer to the inquiry at a step P4 is NO, i.e., if the dielectric breakdown does not occur in the electric discharge lamp 5, the control returns to the step P3. The process as described above is repeatedly executed until the dielectric breakdown occurs in the electric discharge lamp 5.

On the other hand, if the answer to the inquiry at the step P4 is YES, the control proceeds to a step P5 where the frequency of the signal $S_1$ is established to a lower initial value of, for example, 4 kHz. In the LC series resonance circuit 4 as shown in FIG. 1, even if the voltage applied thereto is kept constant, a discharge current passing through the electric discharge lamp 5 is changed with the variation of the frequency. That is, since, with the frequency increased, an integral value of current becomes smaller due to a part of the choke coil L, the current passing through the electric discharge lamp 5 is decreased. Accordingly, a higher value of the discharge current (initial value of 2 A, for example) can be obtained by establishing the frequency of the signal $S_1$ to the lower value of 4 kHz.

At a step P6, a difference $\Delta V_c$ between the actual voltage value $V_{ci}$ and the previous voltage value $V_{ci-1}$ is obtained.

At a step P7, the difference $\Delta V_c$ is compared with a predetermined value $V_1$. If $\Delta V_c < V_1$, the control proceeds to a step P13 where a new $V_{ci}$ is read, then, the control returns to the step P6.

On the other hand, if $\Delta V_c > V_1$, i.e., the difference between the actual voltage value $V_{ci}$ and the previous voltage value $V_{ci-1}$ is more than $V_1$, the control proceeds to a step P8 where the actual voltage value $V_{ci}$ is compared with a predetermined value $V_2$.

At the step P8, if $V_{ci} < V_2$, the control proceeds to a step P9 where the frequency of the signal $S_1$ is increased by a relatively small first predetermined value (150 Hz, for example). Then, the control proceeds to a step P12 which will be described hereinafter. On the other hand, if $V_{ci} > V_2$, the control proceeds to a step P10 where the frequency of the signal $S_1$ is increased by a relatively large second predetermined value (1 kHz, for example).

Subsequently, the control proceeds from the step P10 to a step P11 where the actual voltage value $V_{ci}$ is compared with a predetermined value $V_3$. If $V_{ci} < V_3$, the control proceeds to the step P12 where the actual voltage value $V_{ci}$ is set to the previous voltage value $V_{ci-1}$. Then, the control returns to the step P6 via the step P13, and the process as described above is repeatedly executed.

At the step P11, if $V_{ci} > V_3$, the frequency of the signal $S_1$ is held to the value at that moment, then, the control comes to END.

It is to be noted that each of the predetermined values $V_m$, $V_1$, $V_2$, and $V_3$ is selected, for example: $V_m = 150$ V, $V_1 = 2$ V, $V_2 = 60$ V, and $V_3 = 70$ V. Accordingly, in the control as described above, if the actual voltage value $V_{ci}$ is less than, for example, 150 V, it is determined that the dielectric breakdown occurs in the electric discharge lamp 5, and the frequency of the signal $S_1$ is established at the lower initial value of 4 kHz (in this event, the terminal voltage $V_c$ is about 20 V). Subsequently, whenever the terminal voltage $V_c$ increases by 2 V, the frequency of the signal $S_1$ is increased by 150 Hz when the actual voltage value $V_{ci}$ is less than 60 V, and the frequency is increased by 1 kHz when the actual voltage value $V_{ci}$ is more than 60 V. If the actual voltage value $V_{ci}$ reaches 70 V, the control is so executed as to hold the frequency assumed at this moment.

That is, immediately after the occurrence of the dielectric breakdown in the electric discharge lamp 5, the AC voltage with the frequency of 4 kHz is applied to the lamp 5 so as to pass the heavy current therethrough. Subsequently, the frequency is increased stepwise by a relatively small variation (150 Hz) until the actual voltage value $V_{ci}$ reaches the predetermined value $V_2$. Thereafter, the frequency is increased stepwise by a relatively large variation (1 kHz).

Next, a description will be made with regard to the reason why the variation of the frequency is established so that the variation before the voltage value $V_{ci}$ reaches the predetermined value $V_2$ is different from the variation thereafter.

As described above, upon discharge starting of the electric discharge lamp 5, the voltage having a relatively low frequency is applied to the lamp 5 so as to pass the heavy current therethrough, and the frequency of the applied voltage is changed thereafter to a relatively high value. This results in a quick generation of the luminous energy after starting of the electric discharge lamp 5, and an acquisition of a predetermined value of the luminous energy in the discharge stable state due to restricted value of current passing through the electric discharge lamp 5.

The luminous energy is variable, however, with the temperature in the electric discharge lamp 5 which is in turn variable with the current passing through the lamp 5. Accordingly, if the current is modulated stepwise in a large way, the luminous energy is changed stepwise in this modulating point.

Figure 3A:
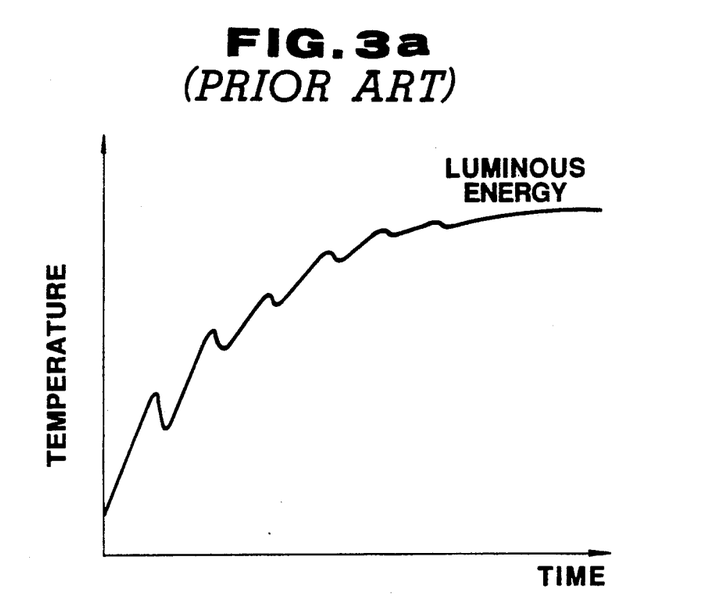
FIG. 3a is a graphical representation showing a change in a luminous energy of an electric discharge lamp during a period ranging from a starting of the lamp to a discharge stable state thereof.

Referring to FIG. 3a, a characteristic curve indicates a change in luminous energy when the electric discharge lamp 5 is controlled in a manner to increase the frequency, which is initially established to 4 kHz, by 1 kHz whenever the terminal voltage $V_c$ increases by 10 V, so as to obtain the discharge stable state at 70 V. As seen from FIG. 3a, in the initial stage of discharge, the luminous energy is greatly changed upon increase in the frequency.

This is due to a relatively large change rate of temperature of the filler gas to a predetermined variation of current when the gas is low in temperature, and the relatively small change rate thereof when the gas is high in temperature. By way of example, when the gas temperature increases from 20° to 40° C. by the variation of current, the change rate of gas temperature is 100%, whereas when the gas temperature increases from 800° to 820° C., the change rate of gas temperature is only 2.5%. Even with the same variation of 20° C., the change rate of the gas temperature is thus different between the two.

As described above, if the electric discharge lamp 5 assuming a large amount of steplike change in luminous energy upon frequency increase serves as a headlamp of a motor vehicle, a pedestrian and/or a driver of an oncoming vehicle may be dazzled thereby.

Accordingly, in this embodiment, the electric discharge lamp 5 is so controlled as to assume a small amount of steplike change in luminous energy upon frequency increase by providing relatively small variation of frequency in the initial stage of discharge, and relatively large variation of frequency thereafter.

Figure 3B:
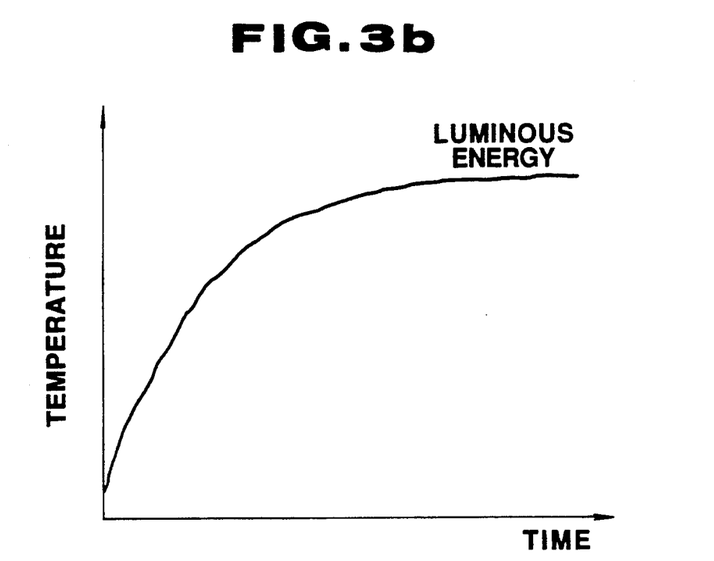
FIG. 3b is a view similar to FIG. 3a, showing in connection with the first preferred embodiment.

Referring to FIG. 3b, a characteristic curve indicates a change in luminous energy when the electric discharge lamp 5 is controlled, as shown in FIG. 2, in a manner to increase the frequency, which is initially established to 4 kHz, by 150 Hz whenever $V_c$ increases by $V_1$ (2 V) during a period ranging from a point of discharge starting to a point where $V_{ci}$ is less than $V_2$ (60 V), and add thereafter by 1 kHz whenever $V_c$ increases by $V_1$ until $V_{ci}$ reaches $V_3$ (70 V = value when the electric discharge lamp 5 falls into the discharge stable state).

Since the temperature in the electric discharge lamp 5 is monotonically increased by establishing the variation of voltage with frequency increase to a small level, and setting the variation of frequency to a small value while the change in luminous energy with respect to the change in current is larger, i.e., immediately after discharge starting, the change in luminous energy looks to be smooth in human eyes as seen from FIG. 3b, thus preventing the a pedestrian or the driver of an oncoming vehicle from being dazzled.

As described hereinbefore, the change in luminous energy depends on the temperature in the electric discharge lamp 5 more than the current passing therethrough (it is to be noted that the temperature is variable with the current). On condition that the frequency is increased by about 150 Hz whenever the terminal voltage $V_c$ increases by 2 V, the change in temperature is small due to sufficiently small variation of current. Additionally, due to slow response of the temperature change, the change in luminous energy is monotonically increased.

In the control shown in FIG. 2, the frequency (consequently, the current value) is stepwise increased whenever the terminal voltage $V_c$ increases by the predetermined value $V_1$. Alternatively, the frequency may continuously be increased in accordance with increase in the terminal voltage $V_c$. In the latter case, in a manner similar to the former case, the variation of the frequency is established so that the variation before the voltage value $V_{ci}$ reaches the predetermined value $V_2$ is different from the variation thereafter.

Further, in the first preferred embodiment described in connection with FIG. 1, the present invention is applied to the lighting device for an electric discharge lamp which generates a high voltage for dielectric breakdown by the LC series resonance circuit 4. In place of the series resonance circuit 4, the present invention may be applied to a lighting device for an electric discharge lamp which is provided with the other high voltage generating means such as an ignitor circuit.

Referring to FIGS. 6-9, there is shown a second preferred embodiment of the present invention.

Figure 6:
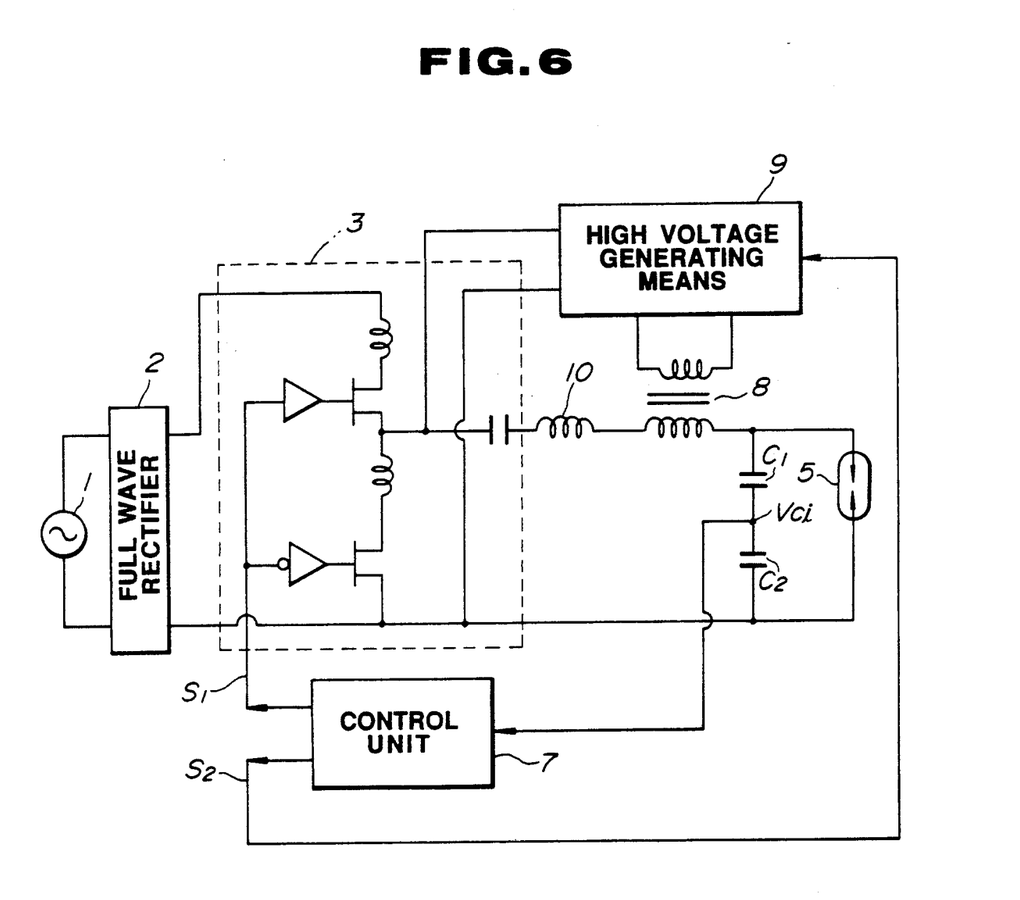
FIG. 6 is a view similar to FIG. 5, illustrating a second preferred embodiment of a lighting device for an electric discharge lamp according to the present invention.

Referring to FIG. 6, the present invention is applied to the aforementioned circuit in which high voltage generating means 9 generate a high voltage out of AC power of an inverter circuit 3 based on a control signal $S_2$ derived from a control unit 7. This high voltage is applied, via a pulse transformer 8, to an electric discharge lamp 5 so as to induce a dielectric breakdown therein. The circuit also includes a current-limiting impedance 10.

Figure 7:
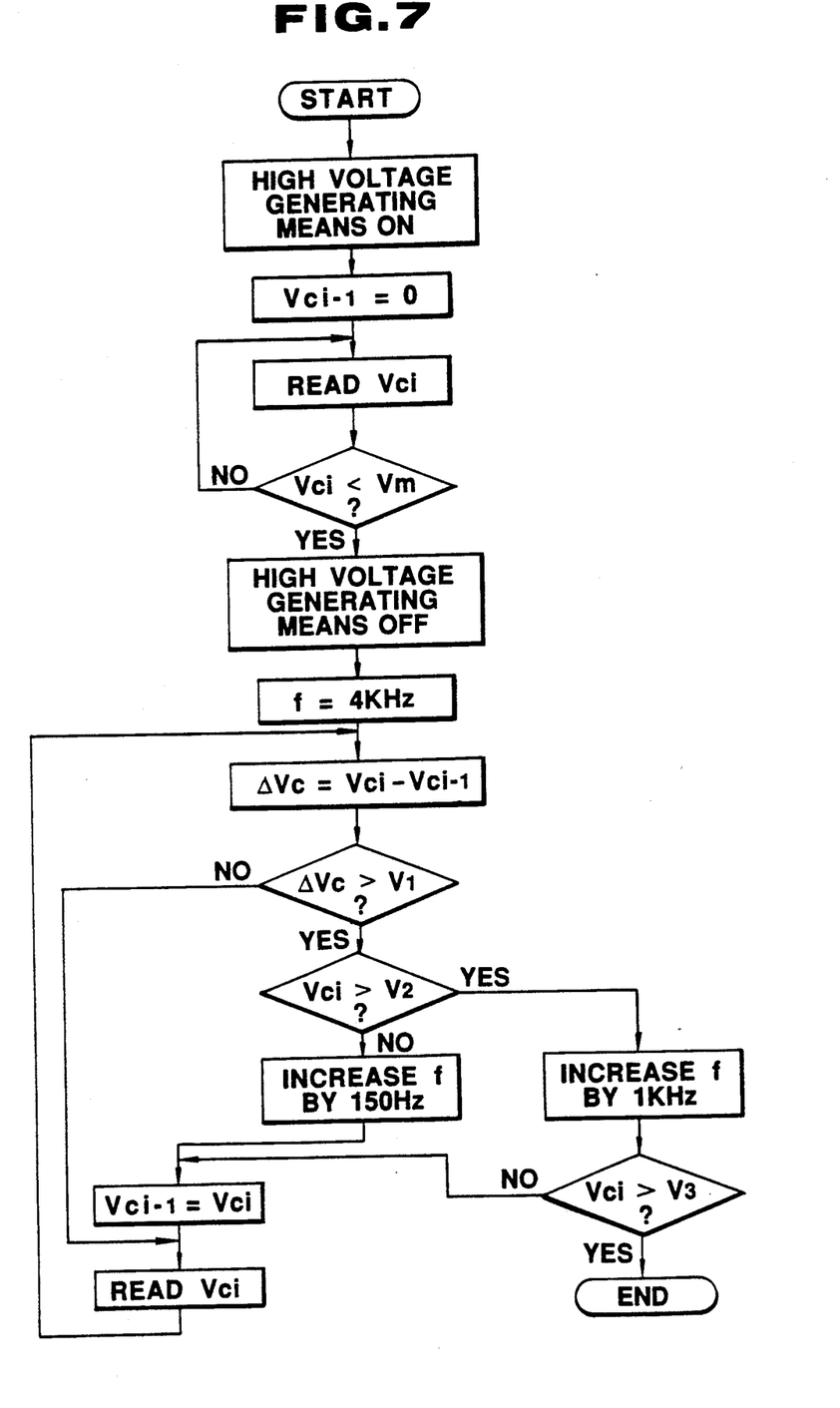
FIG. 7 is a view similar to FIG. 2, illustrating a control executed by a control unit shown in FIG. 6.

Referring to FIG. 7, the control of the second preferred embodiment is substantially the same as that of the first preferred embodiment shown in FIG. 2.

Figure 8:
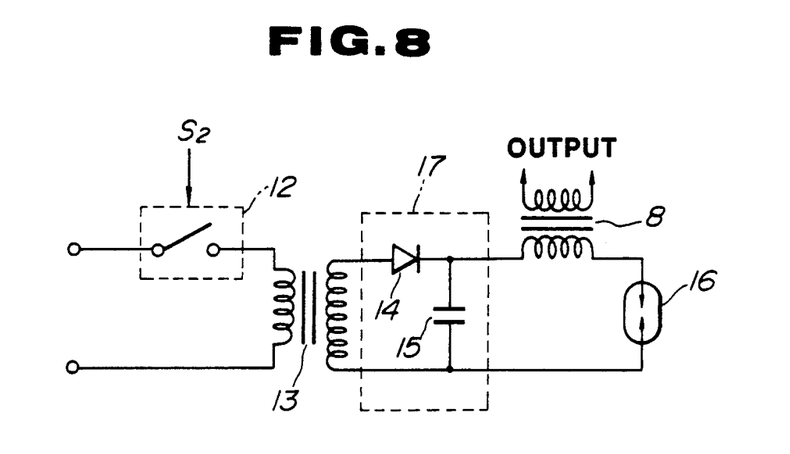
FIG. 8 is a view similar to FIG. 6, illustrating one high voltage generating means shown in FIG. 6.

Referring to FIG. 8, there is shown one circuit of the high voltage generating means 9.

When a relay 12 is turned on by the signal $S_2$ derived from the control unit 7, the inverter circuit 3 provides AC power to a transformer 13 which in turn provides to a rectifier circuit 17 including a diode 14 and a condenser 15 an output voltage which is increased in accordance with a winding ratio. During an initial positive cycle after turning-on of the relay 12, an electric charge to be accumulated in the condenser 15 is gradually increased, and a voltage between both ends of the condenser 15 also is gradually increased therewith. As soon as this voltage exceeds the dielectric breakdown voltage of a discharging gap 16, the discharge occurs at the gap 16, causing a substantially short-circuited state between both electrodes thereof. As a result, the electric charge accumulated in the condenser 15 flows out quickly via a primary coil of the pulse transformer 8. Due to this sudden change of current, an electromotive force is generated in the primary coil of the pulse transformer 8, and a high voltage is generated simultaneously in a secondary coil thereof in accordance with the winding ratio. This high voltage causes the dielectric breakdown in the electric discharge lamp 5 as shown in FIG. 6.

Figure 9:
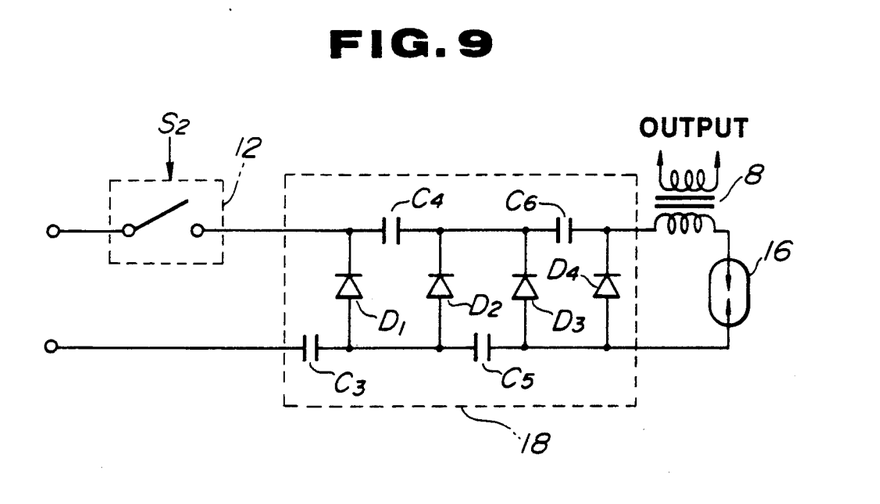
FIG. 9 is a view similar to FIG. 7, illustrating another high voltage generating means shown in FIG. 6.

Referring to FIG. 9, there is shown another circuit of the high voltage generating means 9.

An inverter circuit 3 provides AC power, via a relay 12, to a voltage multiplier circuit 18 including diodes $D_1-D_4$ and condensers $C_3-C_6$. This voltage multiplier circuit 18 has as its function to accumulate an electric charge in the condenser $C_6$ by turning-on of the diodes $D_2$ and $D_4$ during a half positive cycle of the AC power inputted, and turning-on of the diodes $D_1$ and $D_3$ during a half negative cycle thereof. When the electric charge is sufficiently accumulated in the condenser $C_6$ so that the terminal voltage of a discharging gap 16 exceeds a predetermined value, the discharge occurs at the gap 16, resulting in a generation of high voltage in a secondary coil of a pulse transformer 8 in the same manner as described above.

In the aforementioned embodiments, the frequency of AC power to be provided to a discharge circuit or the lighting device is used as a control value for controlling the discharge current, and regulated in accordance with the terminal voltage $V_c$ of the electric discharge lamp 5.

Alternatively, the followings are usable as a control value for controlling the discharge current:

1. Inductance connected with the discharge circuit (the choke coil L shown in FIG. 1, and the current-limiting impedance 10 shown in FIG. 6). In this case, instead of changing the frequency, the discharge current is controlled by changing the impedance of the discharge circuit.

2. Voltage applied to the discharge circuit. By way of example, DC voltage to be applied to the inverter circuit 3 shown in FIGS. 1 and 6, which is controlled in the full wave rectifier 2, is changed in accordance with the terminal voltage $V_c$ of the electric discharge lamp 5.

What is claimed is:

1. A method of starting an electric discharge lamp bulb until the electric discharge lamp bulb assumes a predetermined discharge stable state, comprising the steps of:
   supplying electric power to the electric discharge lamp bulb;
   detecting a terminal voltage across the electric discharge lamp bulb;
   determining whether said terminal voltage is greater than a predetermined value;
   increasing a frequency of said electric power by a first frequency value when it is determined that said terminal voltage is greater than said predetermined value; and
   increasing said frequency of said electric power by a second frequency value when it is determined that said terminal voltage fails to be greater than said predetermined value.

2. A method as claimed in claim 1, wherein said second frequency value is smaller than said first frequency value.

3. A system for starting an electric discharge lamp bulb until the electric discharge lamp bulb assumes a predetermined discharge stable state, comprising:
   a source of electric power, said electric power being supplied to the electric discharge lamp bulb;
   means for detecting a terminal voltage across the electric discharge lamp bulb; and
   a control unit including:
   means for determining whether said terminal voltage is greater than a predetermined value;
   means for increasing a frequency of said electric power by a first frequency value when it is determined that said terminal voltage is greater than said predetermined value; and
   means for increasing said frequency of said electric power by a second frequency value when it is determined that said terminal voltage fails to be greater than said predetermined value.

4. A system as claimed in claim 3, wherein said second frequency value is smaller than said first frequency value.

* * * * *